March 22, 1966 C. K. STEDMAN 3,242,449
PRESSURE TRANSDUCERS
Filed Jan. 2, 1962 2 Sheets-Sheet 1

INVENTOR.
CECIL K. STEDMAN
BY Mathis and Graybeal
ATTORNEYS

March 22, 1966　　　C. K. STEDMAN　　　3,242,449
PRESSURE TRANSDUCERS
Filed Jan. 2, 1962　　　　　　　　　　　2 Sheets-Sheet 2
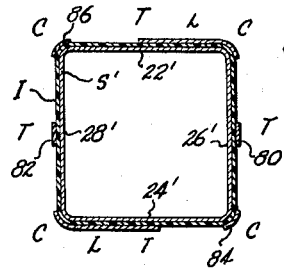
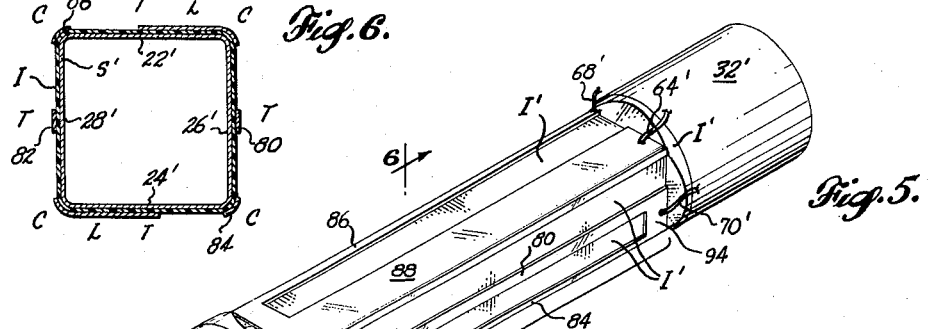
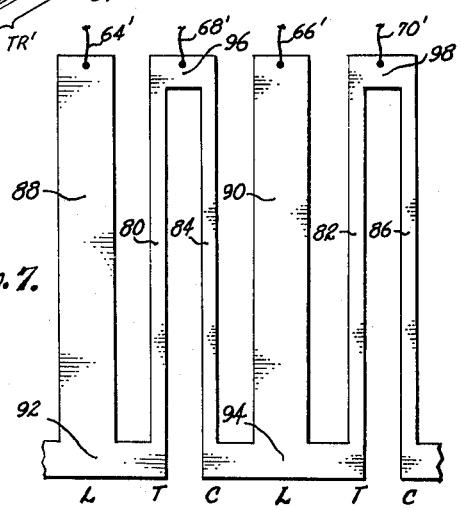
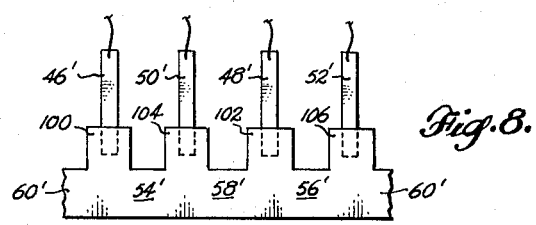
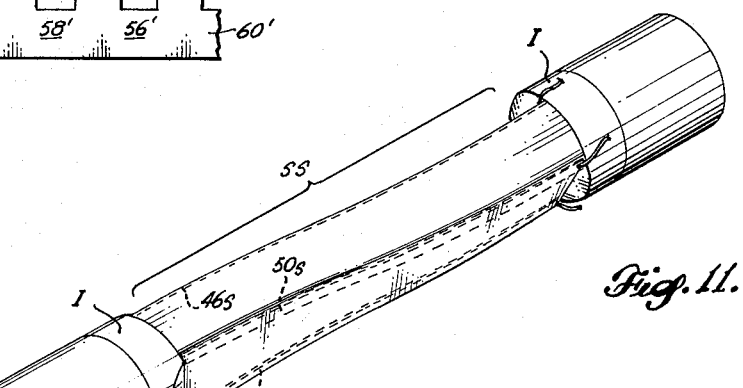
INVENTOR.
CECIL K. STEDMAN
BY Mattus and Graybeal
ATTORNEYS

United States Patent Office 3,242,449
Patented Mar. 22, 1966

3,242,449
PRESSURE TRANSDUCERS
Cecil K. Stedman, Enumclaw, Wash., assignor to Statham Instruments, Inc., Los Angeles, Calif., a corporation of California
Filed Jan. 2, 1962, Ser. No. 163,399
26 Claims. (Cl. 338—4)

The present invention relates to pressure measuring apparatus, and in its primary aspects more particularly relates to sleeve type pressure transducers which in miniaturized form are especially adapted for use as intracardiac transducers. Typical transducers of similar purpose are disclosed in Greenwood U.S. Patent 2,634,721 and Warnick U.S. Patent 2,981,911, for example.

Certain features of the invention also pertain to pressure gages and the like involving generally cylindrical pressure responsive chambers, such as disclosed in Brady U.S. Patent 2,729,730, for example. In still other aspects, certain transducer components characterizing the present invention are applicable to any type of pressure sensitive apparatus having strain sensitive electroconductive means bonded to a pressure flexed base member.

The present invention is a continuation-in-part of the invention disclosed and claimed in my copending application Ser. No. 134,070, entitled Pressure Sensitive Diaphragms with Stress Null Zone Oriented Bridge Patterns, filed Aug. 25, 1961, which application was issued as U.S. Patent No. 3,071,745 on Jan. 1, 1963, particularly as to its electroconductive bridge patterns comprised of integrally formed films, and as to the governing principles concerning film materials having electroconductivity properties characterized by a substantial parallel gage factor $Gp$ and/or a substantial transverse gage factor $Gt$.

In order to illustrate and discuss various features and characteristics of the present invention, primary attention is here addressed to certain typical and therefore nonlimitive embodiments thereof which are especially adapted for usage as intracardiac transducers. In general, such embodiments of the invention comprise a miniaturized sleeve member of non-circular cross section with Wheatstone bridge arms provided on the sleeve member so as to reflect change in electroconductivity in response to pressure induced flexure of the sleeve member. Such a transducer, in miniaturized form, is suitably arranged at the probe end of a catheter which is channeled into the cardiovascular system to a desired location, such as near the heart, the catheter including a hollow tube by which a sample of blood can also be obtained. The catheter tube also includes a plurality of input and output electrical conductors for connecting the transducer with electronic circuitry which is capable of accurately measuring the change in electroconductivity of the bridge arms on the sleeve member, and consequently accurately sensing the intercardiac or intravascular pressure pattern.

Previous catheter transducers such as those disclosed in the aforementioned Greenwood and Warnick patents, provide strain responsive sensitivity by arranging one or more bridge arms in the form of electroconductive wires spirally wound a number of times around a non-circular cross sectional portion of a sleeve or tube, the change in internal pressure within the tube producing tensional strain or change in tensional strain in the spirally wound wire. Such arrangements are inherently relatively inefficient in that they do not utilize in any degree the compressional strain developed in the tubular member when such flexes under positive internal pressure. Further, a miniaturized tubular member with spirally wound wire bridge arms presents a structural arrangement of considerable delicacy, and which is difficult to produce with a reasonable degree of standardization. Bridge arms in the form of spirally wound wire are also disadvantageous in that they tend to have relatively low sensitivity since the tensional wire tends to mechanically "bind" or restrain the movement of the flexure member.

To overcome these disadvantages, the primary object and purpose of the present invention is to provide miniaturized transducer arrangements comprised of thin, laminated layers of deposited material, wherein the total wall thickness of the transducer assembly is extremely thin, with the bridge pattern forming material itself being durable yet so thin and elastically weak that the flexure of the base member is not constrained; and wherein alternate bridge arms are arranged to be oppositely stressed, with each of the bridge arms being disposed essentially within the boundaries of a single strain sector of a non-circular sleeve member, and each juncture area between the bridge arms being disposed substantially in a strain sector boundary area. It is also a basic object, purpose and feature of the invention to provide miniaturized, sleeve type transducers having bridge arms of electroconductive material in film or like form deposited on an insulative substrate in turn deposited on a flexure member, with the entire laminated assembly being in bonded relation throughout for compactness and structural durability. A related and more specific feature of the invention involves a flexed, laminated transducer assembly with silicon monoxide as the insulative substrate material receiving the bridge arm forming material. Another related object and purpose of the invention is to provide, in laminated transducer assemblies, a bridge pattern having sector oriented strain sensitive bridge arms constituted by an integrally formed film or the like, wherein the film is composed of electroconductive material which is preferably in the nature of a semi-conductor, the film having either a substantial parallel gage factor or a substantial transverse gage factor, depending upon whether the specific bridge pattern arrangement is configured to have the pressure induced strain exerted parallel to or perpendicular to the direction of current flow in the bridge arms.

Yet other objects, purposes and features of the invention involve the presentation of various configurations of sleeve type transducers of non-circular cross section, wherein the sleeve member is characterized by having a plurality of flattened sides, one such typical form having an alternating pattern of flattened and curved sides with the alternating strain sectors centered at the lateral centers of the sides, and another such form having a plurality of flattened sides with slightly rounded corners joining adjacent sides, the strain sectors being alternately centered at the sides and at the corners. In certain specific forms, the bridge pattern utilized in conjunction with such non-circular sleeve members is characterized by generally longitudinally extending conductor means coextensive with the bridge arm forming film and situated substantially at strain sector boundaries; and in other forms such conductor means connect with bridge arm juncture areas without complete intersection, so that the film has like constituency throughout the arms and arm junction areas, in a manner analogous to the bridge pattern arrangements characterizing the invention disclosed in my aforesaid U.S. Patent No. 3,071,745.

Additional features and advantages of the present invention relate to miniaturized transducer fabrication simply by means of a succession of coatings or films in appropriate sequence and pattern to provide a transducer assembly with good flexure characteristics (i.e. pressure sensitivity) and good electrical characteristics (i.e. signal output).

These and other inherent objects, features, advantages and characteristics of the present invention will be apparent from the following more specific description of certain illustrative forms thereof, taken together with the accompanying illustrations, wherein like numerals refer to like parts, and wherein:

FIG. 5 is a fragmentary, isometric view of a modified form of sleeve type transducer characteristic of the invention, involving a sleeve member having four flattened sides, with adjacent flattened sides arranged at right angles with respect to each other;

FIG. 6 is a somewhat diagrammatic, cross sectional view of the form of transducer illustrated at FIG. 5, taken substantially along line 6—6 thereof, with thickness dimensions enlarged for clarity of illustration;

FIG. 7 is a somewhat diagrammatic, unrolled layout of connector means and bridge arms characteristic of the form of the invention illustrated at FIGS. 5 and 6;

FIG. 8 is an unrolled view, similar to FIG. 4, illustrating a further modified form of conductor means arrangement, wherein the bridge arms are conductively continuous;

Figure 3:
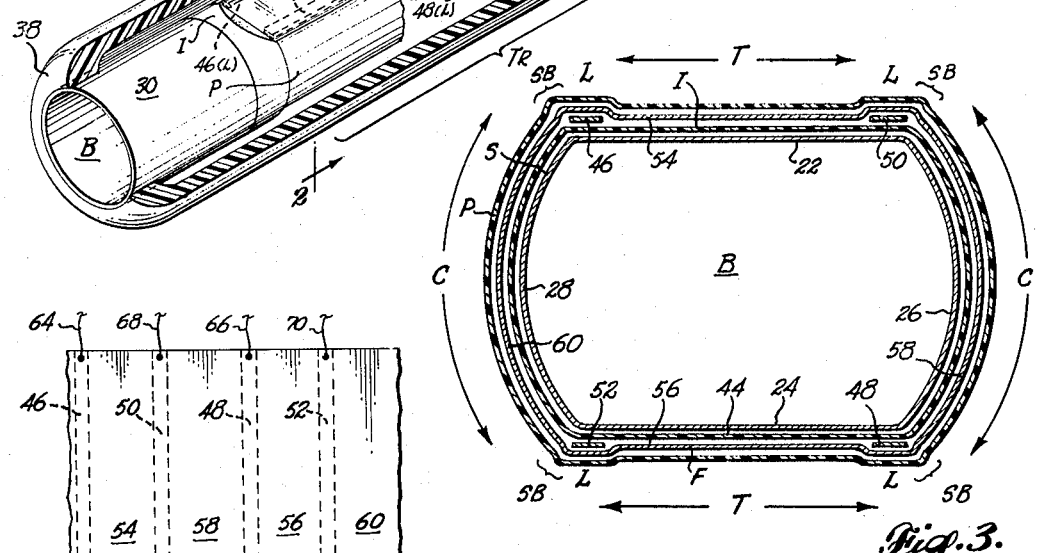
FIG. 3 is a simplified, diagrammatic cross sectional view of the transducer form shown at FIGS. 1 and 2, with the sleeve, bridge arms and conductors enlarged in thickness dimension and interspacing, for clarity of illustration.
Figure 4:
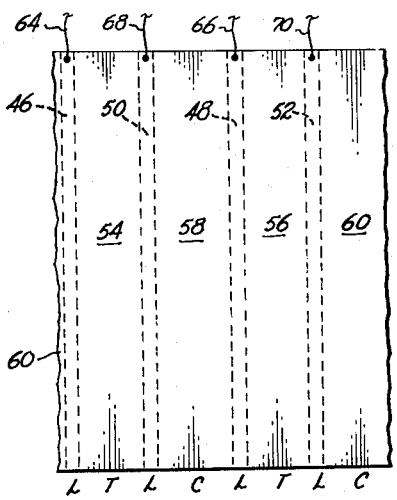
FIG. 4 is a somewhat diagrammatic, unrolled layout of the bridge arms and conductor means shown at FIGS. 1-3.
Figure 9:
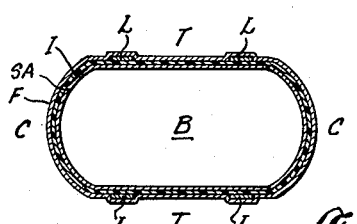
FIG. 9 is a somewhat diagrammatic, cross sectional view similar to FIGS. 3 and 6, illustrating a further modified form of transducer arrangement characteristic of the invention, with relatively wider flattened segments and relatively smaller rounded segments.
Figure 10:
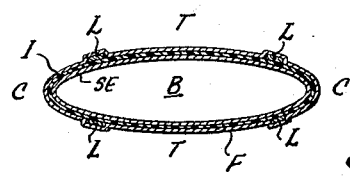

FIG. 10 is a somewhat diagrammatic cross sectional view similar to FIGS. 3, 6 and 9, illustrating a further variation in non-circular cross section of the sleeve member, such cross section in this instance being of essentially elliptical form; and FIG. 11 is a simplified isometric view of a further sleeve type transducer variation, characterized by a somewhat spiralling arrangement of stress sector areas with corresponding bridge arm and conductor means layout.

In the embodiment of the invention shown at FIGS. 1-4, the pressure transducer assembly is generally designated at TR and comprises a flexible sleeve or base member S of non-circular cross section, having two opposed essentially flat sides 22, 24, and two opposed rounded sides 26, 28, each of such sides occupying an approximately equal area of the sleeve member S. End segments 30 and 32 are of circular cross section and are physically extensions of sleeve member S but do not of themselves comprise active components of transducer TR. Sleeve member S and end segments 30, 32 provide an interior conduit or bore B which extends into the catheter tube CT.

An external casement sleeve or casing 36 is also provided, which fairs at end 38 to a smooth juncture with the outer end of end segment 30, and is suitably joined to the end of catheter tube CT, as by cemented threads 40, the sleeve segment 32 being frictionally telescoped within the catheter tube CT to provide a structurally integrated assembly. An interspace or void V between the non-circular transducer TR and the casement sleeve 36 establishes a reference pressure and permits unimpeded flexure of the walls 22, 24, 26, 28 of the transducer sleeve S in response to pressure fluctuations of the blood or other fluid entering the hollow bore B.

The void V between the transducer TR and casing 36 can be at any desired reference pressure, and in the example of an intracardiac transducer will usually be simply at atmospheric pressure, preferably provided by an inert atmosphere. However, as will be readily understood, the void V can be maintained at any other desired referenec pressure in various applications, such as at zero pressure (to measure absolute pressure within the bore B), or at a selected superatmospheric pressure. Also, communication can be provided from void V to an exterior source so that the reference pressure can be varied and/or monitored, as in the case of a differential pressure gage, if desired.

The bonded, multiple-laminate transducer TR illustrated in FIGS. 1-4 additionally comprises an insulative substrate layer I overlying the thin-walled, metallic sleeve member S. Four longitudinally extending conductor means 46, 48, 50, 52 (also denoted leads L in FIGS. 1, 3 and 4) of relatively low resistance electroconductive material are provided as bridge arm connectors. A laterally continuous, integrally formed film F or the like of relatively high resistance electroconductive material provides the electroconductive bridge arms 54, 56, 58, 60. The said bridge arm 54 occupies the area between conductors 46 and 50 and is substantially coextensive with flat side wall 22 of sleeve member S. The said bridge arm 56 occupies the area between conductor means 48 and 52 and is substantially coextensive with flat side wall 24 of sleeve member S. The said bridge arm 58 occupies the area between conductor means 48 and 50 and is substantially coextensive with curved side wall 26 of sleeve member S. The said bridge arm 60 occupies the area between conductor means 46 and 52 and is substantially coextensive with curved side wall 28 of sleeve member S.

If desired, an insulative and protective layer P can coat the electroconductive film F, and the respective conductor means 46, 48, 50, 52 are electrically connected as by soldering to respective output leads 64, 66, 68, 70 which are led externally of the transducer as by being molded into the body of the catheter tube CT. Said leads 64, 66, 68, 70 serve to transmit input and output voltages to external electrical equipment in a manner known per se. Respectively opposed pairs of conductors 46, 48, 50 and 52 of the transducer TR, along with the associated output leads 64, 66, 68, 70, constitute the input and output transmitting means of a Wheatstone bridge circuit wherein respectively opposed pairs of electroconductive film areas 54, 56, 58, 60 constitute the active arms of the bridge.

As an important and fundamental feature of the present invention, each of such bridge arm film areas 54, 56, 58, 60 occupies what may be termed a single strain sector when the sleeve member S flexes. To illustrate, assuming a relatively positive pressure condition exists in the bore B, i.e. internally of the sleeve member S, each of the flattened sides 22, 24 thereof, and the bridge arm film areas 54, 56 bonded thereto, are flexed slightly outwardly and subjected to laterally directed tension (schematically designated T in FIGS. 3 and 4), and the rounded sides 26, 28 along with the film areas 58, 60 bonded thereto are subjected to circumferentially directed compressional strain (schematically designated C in FIGS. 3 and 4).

Functionally, the strain pattern of the outer surface of sleeve member S will be seen to involve separate, longitudinally extending tensional strain sectors T and separate, longitudinally extending compressional strain sectors C, with strain sector boundaries or boundary areas (designated SB in FIG. 3) extending longitudinally of the sleeve member 20 at substantially the corner areas between adjacent sides 22, 24, 26, 28. The longitudinally extending input and output conductor means L (46, 48, 50, 52) present bridge arm junctions which are substantially coincident with the strain sector boundary areas SB. As a practical matter, such strain sector boundary areas SB are characterized by the occurrence of little or no strain along portions of the surface of sleeve member S which are of finite width, and are thus termable "null areas" or "null zones" in like manner as such terms are used to denote the annular "null zone" of a flat diaphragm in my aforesaid application Ser. No. 134,070.

As will be apparent, should a relatively negative pressure occur within bore B of sleeve member S, the bridge arms 54, 56 respectively coincident with the flattened sides 22, 24 of sleeve member S are then subjected to compressional strain (i.e. occupy compressional strain sectors), and the bridge arms 58, 60 respectively coincident with the curved sides 26, 28 of sleeve member S are subjected to tensional strain (i.e. occupy tensional strain sectors), and there is substantially no change in the locations of the strain sector boundaries SB. It is also to be noted with respect to the bridge arm arrangement shown in FIGS. 1–4 that each bridge arm film area 54, 56, 58, 60 is substantially equal to the others in area and spacing between the boundary oriented connectors L, and thus all arms have substantially equal static resistance, assuming the film F is of constant resistance throughout, so that the bridge circuit is electrically substantially self-balanced. The overall thickness of the walls of transducer assembly TR can be exceedingly thin (e.g. on the order of .001″), as will be discussed more fully below in connection with a typical fabrication procedure for the assembly, and the cross sectional view of FIG. 2 attempts to give an indication of the order of thickness of transducer sleeve involved, while FIG. 3 greatly enlarges the layer thicknesses and includes finite separation of layers of the transducer to illustrate its laminate construction.

Figure 2:
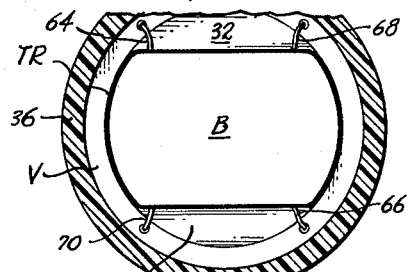
FIG. 2 is a view in lateral cross section on an enlarged scale of the transducer assembly shown at FIG. 1, taken substantially along line 2—2 thereof.
Figure 1:
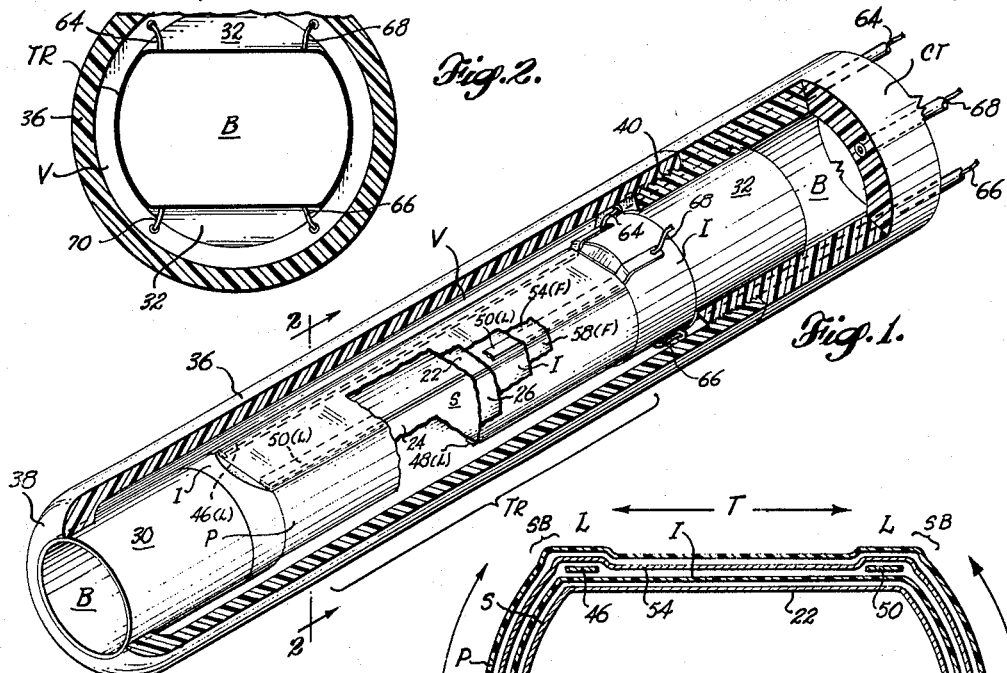
FIG. 1 is an isometric view, with various portions broken away for clarity of illustration, showing a transducer characteristic of the present invention, as arranged in the probe end of a catheter for cardiovascular diagnosis, such transducer being characterized by a construction comprising a pressure flexed sleeve member having sides which are alternately flat and curved.

Detailed consideration will next be given to certain specific materials, dimensional considerations, and fabrication procedures for constructing a transducer assembly such as the catheter transducer TR shown at FIGS. 1–4. It is to be kept in mind that the dimensional requirements in such an instrument are quite exacting; the entire probe end of the catheter as illustrated at FIG. 1 must have an overall diameter of only about 0.1″ or less, and a length of about 1″ or less.

To illustrate suitable fabrication procedure, the transducer base shell constituted by sleeve member S and end segments 30, 32 can be an electroformed metal tube, such as of nickel plated onto an etchable mandrel. A good mandrel for the purpose can be prepared from a centerless ground aluminum rod about 0.05″ in diameter, in which flattened faces are cut (which will produce the flattened faces 22, 24 when the mandrel is electroplated and removed). Each such flattened face in the mandrel can be about 0.32″ long (conforming to the length of the transducer TR), and the parallel, flattened faces in the mandrel can be spaced about .038″ between faces.

The nickel coating is applied to the mandrel to a thickness of about 0.006″ or less, and the mandrel is cut to a suitable overall length, e.g. about 0.5″ (corresponding to the dimension between the outer edges of segments 30, 32). Then, the nickel plated aluminum mandrel is suitably cleaned, as with acetone, to remove grease and oil, and is immersed in an etching solution such as hot NaOH for a sufficient time to dissolve the mandrel.

Since the electroformed nickel tube is to be subsequently manipulated for fabrication of the insulative substrate I, the conductors L, the film F, and the protective overlay P (when applied), one technique for facilitating such handling can involve placement of a nickel plug in the end 32 of the tube, with a stainless steel tube about 1″ long press fitted into end 30 of the tube. The steel rod can then be mounted in a spindle for rotation of the tube during the evaporative deposition. The nickel tube and any other part coming in contact therewith are of course to be maintained free from contamination.

The insulative substrate I can be of any uniformly depositable, insulative material suitable for the purpose, and silicon monoxide (SiO) has been found to be particularly advantageous. Silicon monoxide has heretofore been employed as a condenser dielectric and procedures are available for the evaporative deposition of same. Its deposition should occur onto a heated surface, for good adhesion, and a good rate of deposition has been found to be about 10 to 20 angstroms per second.

For the purposes of providing an effective insulative substrate on a flexed base member in conjunction with an overlay film of electroconductive material, silicon monoxide has properties and characteristics which are in many respects superior to other insulative materials available. For example, silicon monoxide has exceedingly good elongation characteristics, of about 14 parts in 10,000, as compared with only about 1 part in 10,000 for silicon dioxide, and is readily usable and readily reproduceable in very thin layers (e.g. .00004″). It also has a Young's modulus of about 15,000, which generally approximates (i.e. is about 75%) of that of the nickel sleeve member. Also, silicon monoxide when properly deposited on a metallic base member has excellent adhesion, both as to the base metal and as to deposited overlay materials, as is essential on an operationally flexed base member, such as encountered in a transducer. For these reasons, silicon monoxide has been found to be an exceptionally good insulative substrate material in pressure transducers involving either a metal sleeve or diaphragm, and the novel utilization thereof in connection with any type of transducer base member as a substrate between the base member and a film of electroconductive material, as here proposed, is of itself an important feature of the present invention.

The insulative substrate I of silicon monoxide is suitably deposited to a thickness of about .00004″ on the rotated nickel tube, over an area thereof extending throughout the central portion and well up on the end segments 30, 32, such as shown in FIG. 1, to provide effective insulation between the nickel tube and the subsequently applied conductors L and film F.

The conductor means L (46, 48, 50, 52) are then deposited one at a time on the substrate I to overlay the flattened sides 22, 24 of the tube at about the edges thereof, and to extend substantially entirely the length of the sleeve S and somewhat up on the end segment 32, as shown at FIG. 1. These longitudinally extending conductors, as earlier indicated, lie substantially at the stress sector boundaries of the sleeve member S. Since the only function of conductors L is one of electrical connection, the conductors L are to be of relatively low resistance. They can be in the form of thin metal films, suitably having a resistivity on the order of 1–10 ohms per square, and are suitably applied as by evaporative deposition with the aid of a mask having a narrow, elongated aperture which leaves only the desired area of deposition exposed. Palladium (Pd) has been found especially satisfactory for use as the conductors L and suitable ribbons of deposited palladium can be about .006″ wide, with an end-to-end resistivity of 100 ohms or less. Other non-corrosive precious metals such as gold or platinum can also be used for the conductors L, and the conductor means can be otherwise fabricated, as by cementing ribbons of metal leaf onto the sleeve member S. This latter procedure is quite practicable in the event the sleeve member S is of itself formed of an insulative material, such as nylon, and the insulative substrate I is dispensed with.

An electroconductive film F of relatively high resistance is deposited around the sleeve and directly over the conductors L, so as to be in electroconductive relation thereto. A semi-conductive material having good parallel strain responsiveness (parallel gage factor $Gp$) and a static resistivity of about 3500 ohms per square is well suited for use as the bridge arm forming film F. In the dimensional arrangement illustrated, the length of each bridge arm is about seven times its width (direction of current flow), and such a material readily provides a static resistivity of about 500 ohms in each bridge arm. One suitable semi-conductor material, for example, is 25% Cr–75% Si alloy, with a film thickness of 30–40 angstroms. This semi-conductor alloy and other suitable materials for the purpose, as well as a more thorough discussion of appropriate film deposition techniques for the generation of a film type bridge pattern, are presented in my aforementioned U.S. Patent No. 3,071,745. It will be of course understood that the film F here formed is applied while the nickel tube is rotated to obtain uniform film coverage and thickness.

The film areas 54, 56, 58, 60 thus formed will be seen to be superior to bridge arm configurations of the spirally wound wire type, in that each of the film areas occupies but one strain sector of the sleeve member S, and each is in fully bonded relation with respect to the sleeve member. In operation, a substantially uniform current density is generated throughout each film area, with current flow occurring between the conductors L along the entire length of the foil area therebetween.

If desired, an insulative and protective overlay P of a suitable material such as silicon monoxide can be substantially uniformly applied over the foil F, as by evaporative deposition.

Upon completion of the transducer assembly TR, the nickel plug is removed from the end segment 32 which is then pressed into the end of catheter tube CT, whereupon the exposed ends of the respective output leads 64, 66, 68, 70 are electrically connected to the respective conductor means 46, 48, 50, 52, as by solder connections. Then, the steel rod is removed and the casement sleeve 36 is led over the transducer tube and threaded onto the end of the catheter tube CT by means of threads 40, which are preferably cemented to integrate the catheter assembly.

As has been previously noted, the form of the invention illustrated in FIGS. 1–4 is characterized by current flow in the bridge arms laterally of the sleeve member S and parallel to the pressure induced strain. In FIGS. 5–7, an alternative bridge arm and connector pattern is presented in which each bridge arm similarly occupies but a single strain sector of the sleeve member, but in which the direction of current flow in the bridge arms is substantially entirely in directions longitudinal of the sleeve member and substantially entirely perpendicular to the pressure induced strain in the bridge arms. This modified form of bridge pattern is of particular interest from the point of view of having a sensitivity which is essentially entirely a function of the transverse gage factor ($Gt$) of the bridge arm forming material.

Having particular reference to the modified form of the invention illustrated at FIGS. 5–7, and applying prime numeral and letter designations thereto to correlate it and the earlier discussed form of the invention, it will be seen that the transducer TR' comprises a sleeve member S' generally constituted by four flattened sides 22', 24', 26', 28', and joined by end segments 30' and 32'. In overall length and diameter, the transducer shown at FIGS. 5 and 6 can be dimensionally the same as that shown in FIGS. 1–3, and FIG. 6 provides a cross sectional view thereof with thickness dimensions enlarged to more clearly show the orientation of the insulative substrate I' and the various bridge arms and connectors of the bridge pattern.

As will be understood, and assuming a condition of relatively positive pressure within the sleeve member S', the four flattened sides 22', 24', 26', 28' of the sleeve member S' are bowed outwardly slightly so that the centers thereof, laterally considered, are under laterally directed tensional strain (designated T), and the corner areas of the sleeve member S' are correspondingly under laterally directed compressional strain (designated C). In other words, and as diagrammatically portrayed at FIG. 6, the assumed pressure condition develops longitudinally extending tensional strain sectors T in the intermediate areas of the sides 22', 24', 26', 28', and develops compressional strain sectors C in the areas of the corners of the sleeve member S'. In the bridge pattern shown at FIGS. 5–7, the bridge arms and output conductor means are oriented with respect to these various strain sectors to provide a pair of opposed bridge arms 80, 82 which lie within tensional strain sectors T coincident with the center areas of sides 26' and 28', respectively, and to also provide a second pair of opposed bridge arms 84, 86 which lie within compressional strain sectors C coincident with the respective corners of the sleeve member S' between sides 22', 28' and between sides 26', 24'. Also, in order to avoid any requirement for separately fabricated conductor means, such as necessary for conductors 46, 48, 50, 52 in FIGS. 1–4, the bridge pattern shown at FIGS. 5–7 utilizes wide, relatively low resistance film portions as connector means 88, 90 leading from the respective bridge arm juncture areas 92, 94 to the opposite end of the sleeve member S'. Connectors 88 and 90 are in turn electrically connected, as by soldering, to the respective input (or output) voltage transmitting leads 64', 66' (FIG. 7) of the associated catheter tube (not shown). Also, as will be seen in FIGS. 5 and 7, the output (or input) voltage transmitting leads of the bridge pattern shown at FIGS. 5–7 simply comprise the catheter tube leads 68', 70', connected as by being soldered to the respective bridge arm juncture areas 96, 98.

Characteristic of the invention, the juncture areas 92, 94, 96, 98 are situated substantially at the boundaries of the adjacent strain sectors (i.e. at strain null areas), and the bridge arms joined at the junctures are thus effectively each restricted to a single strain sector. In the specific film pattern shown at FIGS. 5–7, the connector film portions 88, 90 for simplicity straddle null zones and also adjacent tension and compression sectors. However, with respect to the film pattern there shown, it is to be noted that such film connectors 88, 90 of themselves form no part of the bridge (being simply input and output voltage transmission means), and can consequently be led in any desired manner from the bridge arm junction areas 92, 94. Even should such connector means 88, 90 be oriented with respect to a strain sector to be wholly or partially sensitive to pressure induced changes in strain, it will be observed that such change in resistance therein has no effect on the condition of balance or unbalance of the bridge arms. In other words, the features of the bridge pattern shown at FIGS. 5 and 7 which is important to the desired manner of operation is that each of the bridge arms 80, 82, 84, 86 lies in a single strain sector of the sleeve member S', and that each of the juncture areas 92, 94, 96, 98 to which the various connectors 88, 90, 68', 70' join are situated at strain sector boundaries, i.e. at points of substantially no strain. As earlier noted, the change in resistance of the bridge arms 80, 82, 84, 86 in response to change in strain occurs essentially entirely as a function of the transverse gage factor ($Gt$) of the bridge arm electroconductive material, since the strain is induced in the sleeve member S' laterally thereof and essentially entirely transversely of the bridge arms 80, 82, 84, 86.

In fabricating the transducer assembly shown at FIGS. 5–7, the nickel tube comprising sleeve member S' can be formed in the same manner as the earlier discussed nickel tube, except that the aluminum mandrel is first flattened on four sides rather than two. The formation of the insulative substrate I' can also proceed in the same manner as was done with respect to insulative substrate I. Fabrication of separate conductor means (46, 48, 50, 52 in the earlier form) is omitted, and an integrally formed, vacuum deposited film of suitable electroconductive material, having a substantial transverse gage factor ($Gt$), such as 50% Cr–50% Si alloy or the like, is applied directly over the entire surface of the sleeve member S'.

The bridge arms 80, 82, 84, 86 and connectors 88, 90 (also note FIG. 7) are engraved or otherwise formed in the film layer by means known per se. In the film pattern shown, the various cuts between the bridge arms and connectors are selected to be all of the same width, so that each can be successively formed with the same tool as a matter of fabrication simplicity. After the film pattern is formed, the input and output transmitting leads 64', 66', 68', 70', are soldered to the connectors 88, 90 and juncture areas 92, 94. An overlay of insulative and protective material (comparable to P but not shown in FIGS. 5 and 6) can also be provided, if desired.

FIG. 8 illustrates a further modified form of the film pattern characterizing the present invention. This film pattern involves lateral current flow through bridge arm forming film areas 54', 56', 58', 60', each oriented to a single strain sector in like manner as the film areas 54, 56, 58, 60 of the form of the invention shown at FIGS. 1–4. The film areas 54', 56', 58', 60', are relatively short in the dimension thereof extending longitudinally of the sleeve member. Connector means 46', 48', 50', 52' generally correspond to the connector means 46, 48, 50, 52 of FIGS. 1–4 but do not extend the full length of the film layer, terminating in separate film layer extensions 100, 102, 104, 106, as shown in FIG. 8. It is in some respects advantageous in a Wheatstone bridge circuit to have the various bridge arms and bridge arm junctions of uniform composition. This is one important feature of an integrally formed bridge pattern of the type disclosed in my aforesaid prior U.S. Patent 3,071,745, wherein the bridge arm juncture areas are of the same, integrally formed material as the bridge arms. The bridge pattern shown in instant FIG. 8 in like manner has uniform electrical conductivity throughout the bridge arms and bridge arm juncture areas since the various connector means 46', 48', 50', 52' do not intersect the respective bridge arm film areas. Each bridge arm film area is effectively confined to but a single strain sector of the sleeve member, and the possibility of transient or erratic unbalance of the bridge by reason of a transient electrical discontinuity between unlike electroconductive materials at the bridge arm terminals is avoided because each bridge arm juncture area is composed of the same material as, and integrally formed with, the bridge arm foil areas. Any change in resistance at the connections between film extensions 100, 102, 104, 106 and the respective connectors 46', 48', 50', 52' appears simply as change in resistance in the input and output voltage transmissions and not as spurious bridge unbalance.

FIGS. 9 and 10 serve to illustrate other typical variations in sleeve member configurations characteristic of the invention, and are to be considered as constituted in the same manner as the transducer assembly TR shown in FIGS. 1–4, except as to cross sectional configuration. Utilizing like designations for corresponding laminates, and noting that these cross sectional views necessarily have the thickness dimension of the laminal construction enlarged for illustration purposes, it will be seen that the sleeve member SA in FIG. 9 has relatively larger flattened sides and relatively more curved but smaller area curved sides, as compared with the sleeve member S of FIGS. 1–4. Correspondingly, as shown in FIG. 9, the conductor leads L are slightly shifted within the edges of the flattened sides, to maintain bridge arm self-balance and maximum sensitivity.

Similarly, FIG. 10 portrays a cross sectional view wherein the sleeve member SE is essentially in the configuration of a flat ellipse. Again, in this configuration, assuming a positive pressure condition internally of sleeve member SE, the respective tensional and compressional strain sectors are as designated at T and C and the corresponding self-balancing orientation of the conductor leads L can be substantially as shown.

Sleeve member SS in FIG. 11 illustrates another type of typical variation as to sleeve member form, with the flattened sides of the sleeve spiralling slightly from end to end. In this configuration, flexure of the sleeve member SS produces change in strain and corresponding change in resistance of the bridge arms in like manner to that characteristic of the form of the invention illustrated at FIG. 1–4, even though the stress sectors and the various conductor means (46S, 48S, 50S being shown) do not extend exactly longitudinally of the sleeve member SS. Thus, it will be seen that the physical orientation of the stress sectors and of the conductor means of the bridge pattern of the present invention is by no means restricted to an orientation which exactly longitudinal of the sleeve (i.e. exactly parallel to the sleeve longitudinal axis), and the terms "longitudinally extending" and "generally longitudinally extending" as used in the description of the invention and the accompanying claims are accordingly subject to liberal interpretation, consistent with the basic principles and modes of operation of the bridge patterns here presented as typifying the present invention. Similarly also, it will be understood that other than exactly longitudinal orientations may be accorded the major dimensions of various bridge arms and connector means of the type found in the bridge pattern arrangement illustrated at FIGS. 5–7.

It will also be apparent that other types of non-circular sleeve member cross sectional configuration can be employed. Thus, simply by way of further example, while four arm bridge arrangements are usually considered most advantageous from the point of view of adequate sensitivity and practical simplicity, two arm and even one arm bridge arrangements are possible wherein the arm or arms are each oriented with respect to essentially a single strain sector of a sleeve or the like with the arm juncture areas positioned substantially at areas of the flexed base member exhibiting little or no strain.

While the various illustrated forms of sleeve type pressure chambers are symmetrical in nature, it will be understood that non-symmetrical variations are also possible, such as configurations which are substantially semicircular, or substantially triangular. And, with respect to any given pressure chamber configuration and selected film pattern layout, electrical self-balance of the bridge pattern is achievable by appropriate variation in the geometry of the bridge pattern. Thus, for example, should a given sleeve configuration or film form prove to have a substantial variation in static resistance from one sector to another, then some of the bridge arm films can be shortened somewhat in axial length, as by etching or engraving, to more nearly achieve electrical self-balance. Electrical unbalance can also be suitably compensated by a slight shift of bridge arm juncture areas to place same somewhat "off null," if desired. It will be understood that, particularly with non-symmetrical sleeve configurations, some degree of design compromise can be dictated in order to obtain the most efficiency from a given type of bridge pattern, in the light of the comparative geometry of the various strain sectors involved, and in the light of other design requirements.

Apparent also will be the proposition that the bridge patterns characteristic of the invention can be arranged internally of a sleeve member in lieu of or in conjunction with bridge pattern arrangements externally of the sleeve.

Wide variation will also be apparent with respect to the various materials to constitute the sleeve member, the insulator materials, the conductor materials, and the bridge arm forming materials. Thus, simply by way of further example, the silicon monoxide substrate layer I, or other suitable non-conductive sleeve, can of itself constitute the pressure flexed member. Another variation of note as to the makeup of a multi-laminate transducer assembly can involve the formation of all laminate layers by evaporative deposition, including the metallic sleeve member S, in which event such sleeve member S can be as thin as about .0001" or less if desired, as when a maximum degree of sensitivity is sought and a lessening of structural durability can be tolerated.

A further notable technique for increasing bridge sensitivity involves thickening the insulative substrate I between the sleeve member and the bridge arm forming foil layer. With a thicker substrate layer of suitable properties, including a relatively low Young's modulus, the pressure induced deformation of the sleeve member or base member is amplified by the thickness of the substrate member so that the change in dimension of the bridge arm is actually greater than the change in dimension of the sleeve member.

These and other variations, modifications, arrangements, adaptations and areas of utilization accordable to the invention will be apparent to those skilled in the art to which the invention is addressed, within the scope of the following claims.

What is claimed is:

1. A pressure transducer comprising:
   (a) a sleeve member of non-circular lateral cross section wherein areas of the sides thereof under pressure flexure exhibit tensional strain and compressional strain in alternate radially related sectors extending generally longitudinally along the sides of the sleeve member, with relatively non-strained boundary areas extending axially of said sleeve member between said strain sectors;
   (b) means defining a plurality of electroconductive bridge arms extending in a continuous pattern around said sleeve member, with each such bridge arm disposed essentially within a single strain sector; and
   (c) relatively low resistance input and output conductor means occupying such axially extending boundary areas and electrically interconnected with said electroconductive bridge arms at locations substantially within the said boundary areas.

2. A bridge type pressure transducer comprising:
   (a) an elongated, thin-walled sleeve of non-circular cross section which changes in wall configuration responsive to changes in pressure differential internally of the sleeve, such changes in wall configuration generating diametrically opposed, longitudinally extending, areas of tensional strain and compressional strain with longitudinally extending areas therebetween exhibiting substantially no stress;
   (b) longitudinally extending, bridge arms composed of electroconductive film in bonded relation to areas of said sleeve subject to maximum strain; and
   (c) conductor means electrically connected with said bridge arms only at points substantially coincident with longitudinally extending areas of said sleeve subject to substantially no stress.

3. A pressure transducer in the form of a sleeve of non-circular cross section, said sleeve under differential pressure induced strain being characterized on a surface thereof by a strain pattern having oppositely related, longitudinally extending surface areas under relatively high tensional strain, and oppositely related, longitudinally extending surface areas under relatively high compressional strain, with strain null areas therebetween; a bridge pattern circumscribing said sleeve and comprising:
   (a) a film of electroconductive material of relatively high electrical resistance deposited over such surface in continuous pattern around said sleeve and flexed therewith in like strain pattern; and
   (b) relatively low resistance input and output conductor means interconnected with said film substantially at strain null areas thereof.

4. A differential pressure gage comprising:
   (a) a thin-walled sleeve of generally quadrangular cross section developing longitudinally extending strain sectors when pressure flexed;
   (b) electroconductive bridge arms bonded to said sleeve in diametrically opposed orientation; and
   (c) conductor means between said bridge arms and substantially coincident with angular portions of said sleeve, the said bridge arms and said conductor means extending generally longitudinally of said sleeve so as to place each bridge arm in essentially only one quadrant and only one strain sector of the sleeve.

5. A pressure responsive device comprising:
   (a) an elongated sleeve of polyangular cross section which under differential pressure induced strain is characterized by the generation on a surface thereof of alternately related longitudinally extending tensional sectors and compressional sectors; and
   (b) a bridge arm pattern in bonded relation to said sleeve, said bridge pattern being composed of a thin, integrally formed film of electroconductive material, said bridge arm pattern consisting of:
      (1) electroconductive film areas each providing a bridge arm and each restricted essentially to a separate sector of the sleeve; and
      (2) conductor means extending generally longitudinally of said sleeve substantially at the boundary areas between said sectors.

6. A pressure responsive device according to claim 5, wherein the film of electroconductive material forming each said bridge arm extends circumferentially of said sleeve, spanning the entire area between the conductor means at the boundaries of the sector.

7. A pressure responsive device according to claim 6, wherein said film of electroconductive material constituting the respective bridge arms extends longitudinally of the sleeve a distance which is several times the distance of separation of the conductor means.

8. A pressure responsive device according to claim 5, wherein said film is composed of an evaporatively deposited semi-conductor material.

9. A pressure responsive device according to claim 5, wherein the film of electroconductive material forming the bridge arms has an electroconductivity characterized by a substantial parallel gage factor, and the change of current flow therein between the conductor means is responsive essentially entirely to strain induced in the film in a direction parallel to the current flow.

10. A pressure responsive device according to claim 5, wherein the film of electroconductive material is composed of a material having an electroconductivity characterized by a substantial transverse gage factor, with each bridge arm oriented so that change in electroconductivity thereof is manifested essentially entirely as a function of strain transverse to the direction of current flow therein.

11. In a pressure transducer:
    (a) a base member subject to change in shape responsive to differential pressure; and
    (b) a bridge pattern comprising a plurality of bridge arms, each of said bridge arms being oriented with respect to said base member to establish the current flow in the bridge arms essentially entirely transversely of the pressure induced strain therein.

12. In a pressure transducer:
    (a) a base member in the form of a sleeve of non-circular cross section which develops along the sides thereof an alternating pattern of longitudinally extending radially related strain sectors responsive to differential pressure; and
    (b) a bridge pattern comprising a plurality of bridge arms, each of said bridge arms being disposed in a single such strain sector and so constructed and oriented with respect to said base member that the current flow in the bridge arm is essentially entirely transverse to the pressure induced strain in said bridge arm.

13. A sleeve type pressure transducer, having a noncircular cross section with a series of longitudinally extending bridge arms in alternate arrangement around said sleeve, each alternate bridge arm being composed of an integrally formed film of electroconductive material and disposed to be oppositely stressed as compared with a bridge arm adjacent thereto, with each bridge arm lying essentially within the boundaries of a single strain sector of the sleeve member, and with each bridge arm juncture area being substantially coincident with a strain sector boundary and composed of the same integrally formed film material as the bridge arm it interconnects, and being in turn electrically connected to bridge voltage conductor means.

14. In a pressure transducer:
(a) a flexible silicon monoxide substrate; and
(b) integrally formed, bridge arm means in bonded relation to said silicon monoxide substrate said bridge arm means consisting essentially of a silicon-metal alloy containing sufficient silicon to increase the electrical resistivity of the bridge arm means to a predetermined value.

15. In a pressure transducer:
(a) a flexible silicon monoxide substrate; and
(b) bridge arm means comprising an integrally formed film of electroconductive material in bonded relation to said silicon monoxide substrate, said electroconductive material consisting essentially of a silicon-metal alloy with sufficent silicon present to increase the electrical resistivity of said material to a predetermined value.

16. In a pressure transducer:
(a) a flexible silicon monoxide substrate;
(b) bridge arm means constituted by an integrally formed film of electroconductive material in bonded relation to said silicon monoxide substrate, said electroconductive material consisting essentially of a silicon-metal alloy containing sufficient silicon to increase the electrical resistivity of the said material to a predetermined value; and
(c) input and output connector means electrically connected to said bridge arm means at points thereof subjected to relatively little strain upon flexure of said film.

17. In a pressure sensitive transducer:
(a) a compliant, metallic base member subject to change in shape responsive to differential pressure;
(b) an insulating substrate of silicon monoxide in bonding relation to said base member; and
(c) a bridge arm pattern comprising an integrally formed film of electroconductive material in bonding relation to said silicon monoxide substrate, said electroconductive material consisting essentially of a silicon-metal alloy containing sufficient silicon to increase the electrical resistivity of the said material to a predetermined value.

18. A pressure transducer having a cross-sectionally non-circular, multi-laminated sleeve wall construction comprising interbonded layers arranged in the following sequence:
(a) an insulative substrate;
(b) a plurality of separate, longitudinally extending low resistance connectors;
(c) an integrally formed, electroconductive film material circumscribing said insulative substrate, the said conductors being electrically connected to said film at areas thereof subject to relatively little strain when said sleeve is subjected to differential pressure.

19. A pressure transducer according to claim 18, wherein each of said layers is formed by evaporative deposition so as to be of uniform thickness and constituency.

20. A pressure transducer having a cross-sectionally non-circular, multi-laminated sleeve wall construction comprising interbonded layers arranged in the following sequence:
(a) a metallic base member;
(b) a flexible insulative substrate;
(c) a plurality of separate, longitudinally extending low resistance connectors;
(d) an integrally formed film of semi-conductor material circumscribing said insulative substrate and said conductors, the said conductors being electrically connected to said film in areas thereof subject to relatively little strain when said sleeve is subjected to differential pressure.

21. A pressure transducer according to claim 20, wherein each of said layers is formed by evaporative deposition.

22. A pressure transducer according to claim 20, wherein the total wall thickness is on the order of .001 inch.

23. A pressure transducer according to claim 22, wherein said insulative substrate is composed of silicon monoxide.

24. A pressure transducer having a cross-sectionally non-circular, multi-laminated sleeve wall construction comprising interbonded layers arranged in the following sequence:
(a) a base member of electroformed nickel;
(b) a silicon monoxide insulative substrate;
(c) a plurality of separate, longitudinally extending palladium connectors;
(d) an integrally formed film of semi-conductor material circumscribing said insulative substrate and said conductors, the said conductors being connected to said film in areas thereof subject to relatively little strain when said sleeve is subjected to differential pressure.

25. An article of manufacture comprising interbonded laminate layers arranged in the following sequence:
(a) a flexible base member;
(b) a flexible silicon-monoxide containing insulative substrate bonded to said base member; and
(c) an electroconductive material bonded to said insulative substrate, said electroconductive material consisting essentially of a silicon-metal alloy having sufficient silicon present to materially increase the resistivity of said material as compared with the resistivity thereof in absence of silicon.

26. An article of manufacture according to claim 25, wherein such silicon containing electroconductive material is a silicon-chromium alloy.

References Cited by the Examiner

UNITED STATES PATENTS

| 2,601,781 | 7/1952 | Fillion | 338—5 |
| 2,621,276 | 12/1952 | Howland | 338—2 |
| 2,634,721 | 4/1953 | Greenwood | 338—2 |
| 2,729,730 | 1/1956 | Brady | 338—3 |
| 2,784,593 | 3/1957 | Peucker | 338—4 |
| 2,808,351 | 10/1957 | Colbert et al. | 338—308 |
| 2,981,911 | 4/1961 | Warnick | 338—4 |
| 2,989,714 | 6/1961 | Park et al. | 338—32 |
| 3,046,788 | 7/1962 | Laimius | 73—398 |

RICHARD M. WOOD, *Primary Examiner.*